(No Model.)

R. GRISWOLD.
HAY RACK.

No. 307,191. Patented Oct. 28, 1884.

WITNESSES:
Chas. Nida
C. Sedgwick

INVENTOR:
R. Griswold
BY Munn & Co
ATTORNEYS.

UNITED STATES PATENT OFFICE.

ROBERT GRISWOLD, OF WOODY, KANSAS.

HAY-RACK.

SPECIFICATION forming part of Letters Patent No. 307,191, dated October 28, 1884.

Application filed March 3, 1884. (No model.)

*To all whom it may concern:*

Be it known that I, ROBERT GRISWOLD, of Woody, in the county of Lincoln and State of Kansas, have invented certain new and useful Improvements in Hay and Grain Racks, of which the following is a full, clear, and exact description.

Reference is to be had to the accompanying drawings, forming part of this specification, in which similar letters of reference indicate corresponding parts in both the figures.

Figure 1:
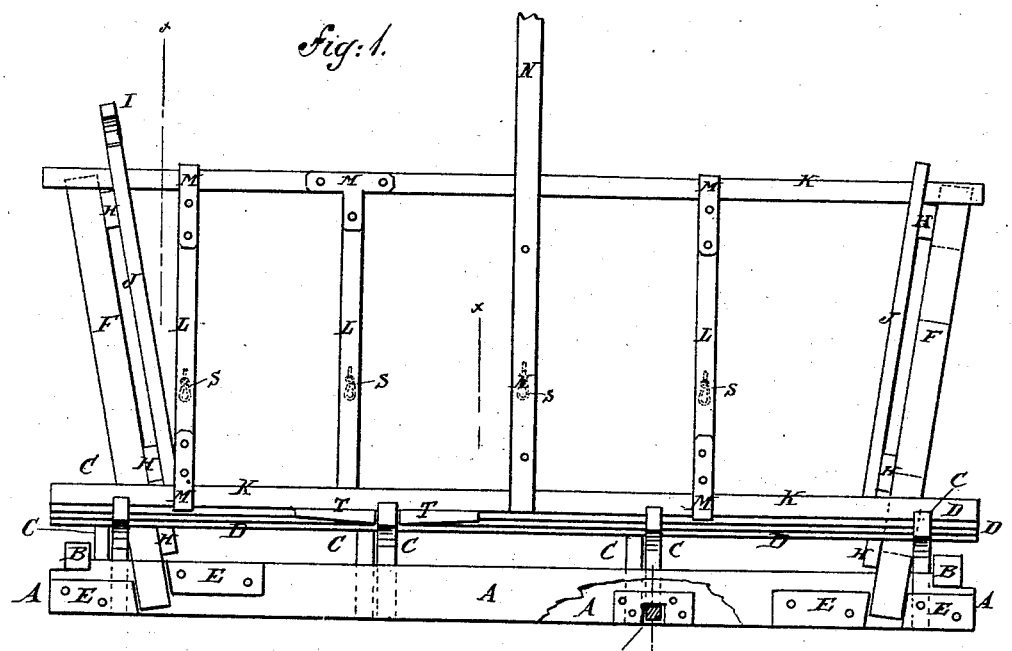
Figure 2:
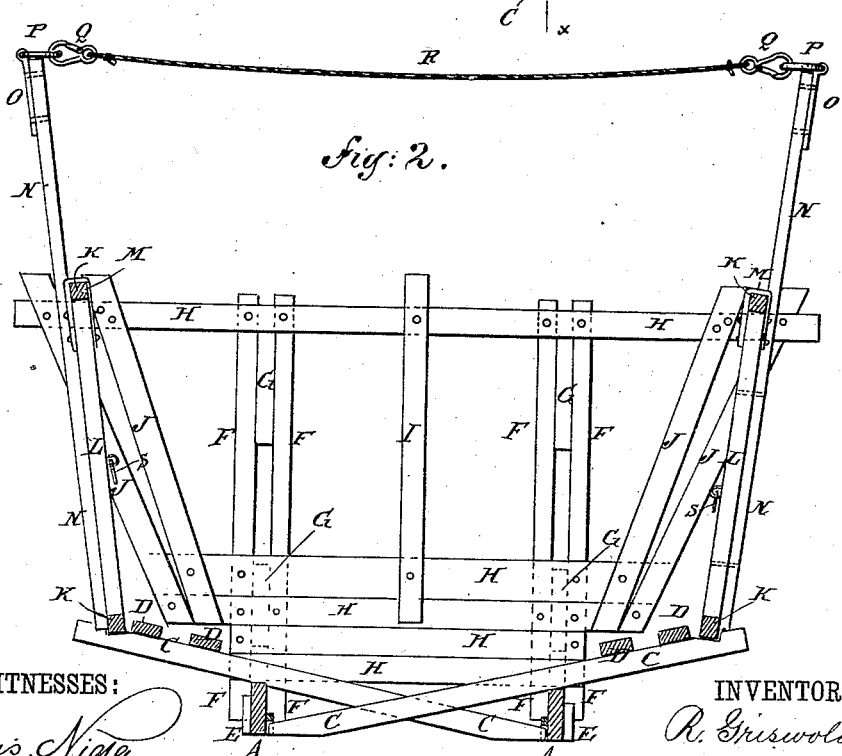

Figure 1 is a side elevation of my improvement, parts being broken away. Fig. 2 is a sectional end elevation of the same, taken through the broken line $x\ x\ x$, Fig. 1.

The object of this invention is to facilitate the unloading of hay and loose grain upon stacks.

The invention consists in a hay and grain rack constructed with the sills, cross-bars, and side bars of an ordinary hay-rack, provided with peculiarly-constructed ends and sides to confine the hay while being transported and allow the rack-sides to be readily detached for convenience in unloading. To the rack-sides are attached upwardly-projecting bars provided at their upper ends with rings to receive snap-hooks attached to the ends of a rope, to cross the top of the load and confine the hay while being transported, as will be hereinafter fully described.

A are the sills of the rack, which are connected by cross-bars B, and are designed to rest upon the wagon-bolsters in the ordinary manner. Upon the sills A rest cross-bars C, the inner parts of which cross each other between the sills A, and their inner ends rest in recesses in the lower inner sides of the said sills A. The outer parts of the cross-bars C project, and to their upper sides are attached two or more longitudinal bars, D.

As thus far described, there is nothing new in the construction.

To the opposite sides of the end parts of the sills A are attached pairs of blocks or cleats E, the adjacent ends of the blocks of the said pairs being placed at such a distance apart as to receive between them the lower ends of the pairs of bars F, the bars of each pair being kept at the proper distance apart by blocks G, interposed between and secured to them.

To the inner sides of the upper and lower parts of the bars F, at each end of the rack, are attached horizontal cross-bars H, to the inner sides of which is attached a bar, I. The upper end of the bar I, at the forward end of the rack, projects for the reins to be attached to for holding the horses.

To the inner sides of the ends of the bars H are attached pairs of outwardly-inclined bars J, the lower ends of the bars J of each pair being placed close together and the upper ends at such a distance apart as to receive between them the end of a top bar of a rack-side. The rack-sides are formed of longitudinal top and bottom bars, K, connected by cross-bars L. The connection between the bars K and the ends of the bars L can be strengthened by metallic straps M, which may be made T-shaped and attached to the said bars, as shown in Fig. 1, or U-shaped and passed around the bars K and attached to the bars L, as shown in Figs. 1 and 2. The ends of the top bars K rest upon the top bars H of the rack ends between the upper ends of the bars J. The bottom bars K rest in recesses formed in the upper sides of the outer ends of the inclined cross-bars C. With this construction the sides and ends of the rack are readily detached, or the ends can be permanently attached to the sills A and the sides made detachable.

To the middle parts of the rack-sides K L are attached bars N, the upper ends of which extend upward to such a height that their upper ends will be at or near the top of the load, and with the said upper ends are connected, by straps O or other suitable means, rings P, to receive snap-hooks Q, attached to the ends of a rope, R, to extend across the top of the load.

To the lower parts of the bars L of the rack-sides are attached snap-hooks S, to receive rings attached to the ends of cords, forming a netting to be spread over the rack to receive the hay, as shown in Patent No. 287,667, issued to me October 30, 1883.

To the bottom bars K of the sides are attached cleats T at such a distance apart that their adjacent ends will rest against the opposite sides of the cross-bars C, and thus hold the sides of the rack from longitudinal movement.

Having thus described my invention, what I claim as new, and desire to secure by Letters Patent, is—

1. In a hay and grain rack, the combination, with the sills A, the cross-bars C, and the side bars, D, of the ends F H I J and sides K L, substantially as herein shown and described, whereby the hay or grain will be securely held in place while being transported, as set forth.

2. In a hay and grain rack, the rack ends, made substantially as herein shown and described, and consisting of the pairs of bars F, the horizontal bars H, and the pairs of inclined bars J, to adapt the said ends to be applied to the rack-sills and to receive the top bars of the rack-sides, as set forth.

3. In a hay and grain rack, the rack-sides, made substantially as herein shown and described, and consisting of the top and bottom bars, K, and the cross-bars L, to adapt the said sides to be applied to the ends and inclined cross-bars of a hay-rack, as set forth.

4. In a hay and grain rack, the combination, with the rack-sides K L, of the upwardly-projecting bars N, provided at their upper ends with rings P, and the rope R, provided at its ends with snap-hooks Q, substantially as herein shown and described, whereby the load can be held in place while being transported, as set forth.

ROBERT GRISWOLD.

Witnesses:
B. W. SMITH,
W. H. LEAY.